US011111351B2

(12) United States Patent
Koshita et al.

(10) Patent No.: US 11,111,351 B2
(45) Date of Patent: Sep. 7, 2021

(54) FOAMING PARTICLE MOLDED BODY

(71) Applicant: JSP Corporation, Tokyo (JP)

(72) Inventors: Nobumasa Koshita, Tokyo (JP);
Masaharu Oikawa, Tokyo (JP);
Tatsuya Hayashi, Yokkaichi (JP)

(73) Assignee: JSP Corporation, Tokyo (JP)

(*) Notice: Subject to any disclaimer, the term of this patent is extended or adjusted under 35 U.S.C. 154(b) by 127 days.

(21) Appl. No.: 16/491,456

(22) PCT Filed: Mar. 1, 2018

(86) PCT No.: PCT/JP2018/007850
§ 371 (c)(1),
(2) Date: Sep. 5, 2019

(87) PCT Pub. No.: WO2018/163968
PCT Pub. Date: Sep. 13, 2018

(65) Prior Publication Data
US 2020/0032025 A1 Jan. 30, 2020

(30) Foreign Application Priority Data
Mar. 6, 2017 (JP) .............................. JP2017-042080

(51) Int. Cl.
C08J 9/232 (2006.01)
B29C 44/44 (2006.01)
B29C 44/54 (2006.01)
B29C 44/02 (2006.01)
C08J 9/18 (2006.01)
B29K 75/00 (2006.01)

(52) U.S. Cl.
CPC ............. *C08J 9/232* (2013.01); *B29C 44/02* (2013.01); *B29C 44/445* (2013.01); *C08J 9/18* (2013.01); *B29K 2075/00* (2013.01); *C08J 2203/06* (2013.01); *C08J 2203/22* (2013.01); *C08J 2205/052* (2013.01); *C08J 2375/04* (2013.01)

(58) Field of Classification Search
CPC . C08J 9/232; C08J 9/18; C08J 2203/06; C08J 2203/22; C08J 2205/052; C08J 2375/04; C08J 2300/22; B29C 44/02; B29C 44/445; B29C 44/00; B29K 2075/00
See application file for complete search history.

(56) References Cited

U.S. PATENT DOCUMENTS

| | | | |
|---|---|---|---|
| 2006/0223897 A1 | 10/2006 | Sasaki | |
| 2012/0115968 A1 | 5/2012 | Shima et al. | |
| 2013/0266792 A1 | 10/2013 | Nohara et al. | |
| 2015/0315351 A1 | 11/2015 | Shinohara et al. | |
| 2016/0244587 A1* | 8/2016 | Gutmann | B29B 7/88 |
| 2018/0155518 A1 | 6/2018 | Koshita et al. | |
| 2018/0244879 A1 | 8/2018 | Takehara et al. | |
| 2019/0276627 A1 | 9/2019 | Takagi et al. | |

FOREIGN PATENT DOCUMENTS

| | | | |
|---|---|---|---|
| CN | 104194030 A | * | 12/2014 |
| JP | S55-147534 A | | 11/1980 |
| JP | H08-113664 A | | 5/1996 |
| JP | H08113664 | * | 5/1996 |
| JP | H08-156000 A | | 6/1996 |
| JP | H10 329220 | * | 12/1998 |
| JP | H10-329220 A | | 12/1998 |
| JP | 102558696 A | | 7/2012 |
| JP | 2014-062213 A | | 4/2014 |
| JP | 2014062213 A | * | 4/2014 |
| JP | 109937232 A | | 6/2019 |
| TW | 200643077 A | | 12/2006 |
| TW | 201637809 A | | 11/2016 |
| TW | 201708333 A | | 3/2017 |
| WO | 2007/082838 A1 | | 7/2007 |
| WO | 2016/052387 A1 | | 4/2016 |

OTHER PUBLICATIONS

Extended European Search Report issued in corresponding EP Application No. 18763925.7 dated Oct. 14, 2020 (7 pages).
International Search Report for PCT/JP2018/007850, dated Jun. 5, 2018, and English Translation submitted herewith (5 pages).

* cited by examiner

*Primary Examiner* — Kara B Boyle
(74) *Attorney, Agent, or Firm* — Fitch, Even, Tabin & Flannery, LLP

(57) ABSTRACT

The present invention relates to an expanded beads molded article, which is obtained through in-mold molding of expanded thermoplastic elastomer beads, has voids, and has a density of 150 to 300 kg/m³ and a voidage of 10 to 70% by volume.

6 Claims, 8 Drawing Sheets (a)

(b)

(c)

(a)

(b)

(c)

FOAMING PARTICLE MOLDED BODY

CROSS-REFERENCE TO RELATED APPLICATIONS

This application is a U.S. national phase application filed under 35 U.S.C. § 371 of International Application Number PCT/JP2018/007850, filed Mar. 1, 2018, designating the United States, which claims priority from Japanese Application Number 2017-042080, filed Mar. 6, 2017.

FIELD OF THE INVENTION

The present invention relates to an expanded thermoplastic elastomer beads molded article.

The thermoplastic elastomer is hereinafter occasionally abbreviated as "TPE". In addition, the expanded thermoplastic elastomer beads molded article is occasionally referred to simply as "expanded beads molded article".

BACKGROUND OF THE INVENTION

A thermoplastic elastomer (TPE), such as a thermoplastic urethane elastomer (TPU), exhibits characteristics close to those of vulcanized rubbers, is excellent in flexibility and repulsion elasticity, and is used for a variety of applications, such as cushioning materials, vibration-damping materials, sports goods, and automobile members.

An expanded molded article obtained through expansion of this TPE is able to contemplate to achieve lightness in weight, while keeping its excellent characteristics, such as flexibility and repulsion elasticity, and hence, further development of applications in sports goods, automobile members, and so on is expected in the future. The expanded molded article of TPE can be produced by an extrusion expansion method, a press expansion method, an in-mold molding method using expanded beads, or the like. As such an expanded beads molded article of TPE, for example, an expanded beads molded article described in PTL 1 is known as the background art.

CITATION LIST

Patent Literature

PTL 1: WO 2007/082838 A

SUMMARY OF INVENTION

However, in the conventional expanded TPE beads molded articles, there was involved such a problem that after compressing the molded article and completing the compression, a time required for restoration of the shape before compression is long.

A problem to be solved by the present invention is to provide an expanded TPE beads molded article having favorable restorability of the shape within a short time after compression.

The present invention is as follows.

[1] An expanded beads molded article, which is obtained through in-mold molding of expanded thermoplastic elastomer beads, has voids among expanded beads, and has a density of 150 to 300 kg/m$^3$ and a voidage of 10 to 70% by volume.

[2] The expanded beads molded article as set forth in the above [1], wherein in the measurement of a compression set at 23° C. on a basis of JIS K6767:1999, the compression set of the expanded beads molded article 30 minutes after completion of compression is 7% or less.

[3] The expanded beads molded article as set forth in the above [1] or [2], wherein a tensile strength at break of the expanded beads molded article is 0.3 MPa or more.

[4] The expanded beads molded article as set forth in any one of the above [1] to [3], wherein a modulus of repulsion elasticity of the expanded beads molded article is 50% or more.

[5] The expanded beads molded article as set forth in any one of the above [1] to [4], wherein a modulus of repulsion elasticity of the thermoplastic elastomer constituting the expanded beads molded article is from 30 to 50%.

[6] The expanded beads molded article as set forth in any one of the above [1] to [5], wherein the thermoplastic elastomer constituting the expanded beads molded article is a thermoplastic urethane elastomer having a type A durometer hardness of 95 or less.

In accordance with the present invention, it is possible to provide an expanded TPE beads molded article with favorable restorability of the shape within a short time after compression.

DESCRIPTION OF EMBODIMENTS

<Expanded Thermoplastic Elastomer Beads Molded Article>

Figure 1:
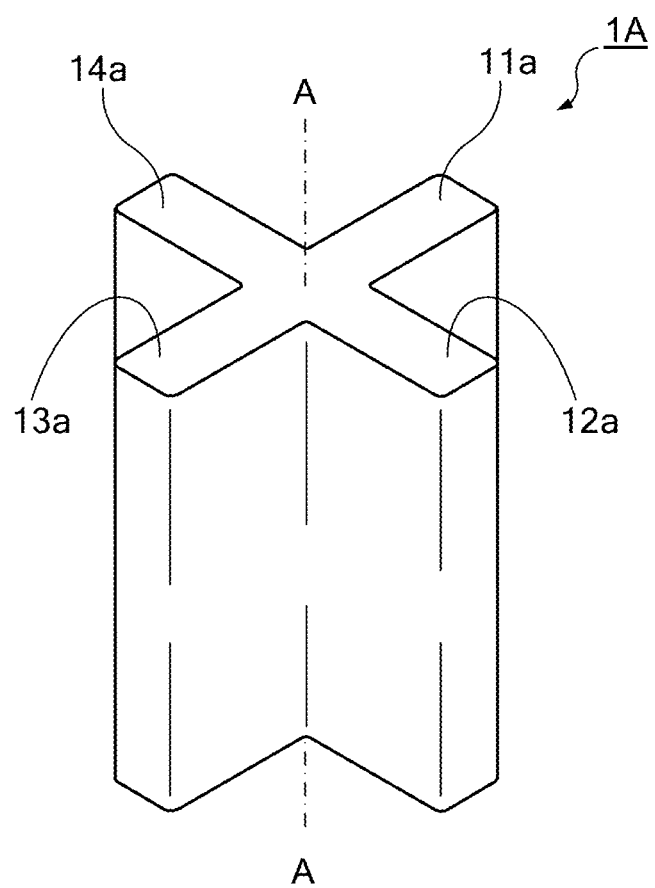
FIG. 1 is a view showing an example of a shape of an expanded bead capable of increasing a voidage of an expanded TPE beads molded article.

The expanded thermoplastic elastomer beads molded article (expanded TPE beads molded article) is an expanded beads molded article obtained through in-mold molding of expanded thermoplastic elastomer beads, wherein the expanded beads molded article has voids among expanded beads, and has a density of 150 to 300 kg/m$^3$, and a voidage of 10 to 70% by volume.

In view of the fact that the expanded TPE beads molded article has the aforementioned characteristics, after compressing the molded article and completing the compression, it is possible to restore the shape before compression within a short time.

[Thermoplastic Elastomer]

The thermoplastic elastomer constituting the expanded TPE beads molded article of the present invention is not particularly limited, and examples thereof include a thermoplastic olefin elastomer (TPO), a thermoplastic styrene elastomer (TPS), and a thermoplastic urethane elastomer (TPU). These thermoplastic elastomers can be used alone or in admixture of two or more thereof.

[Thermoplastic Olefin Elastomer]

The thermoplastic olefin elastomer (TPO) means a thermoplastic elastomer which is constituted of a polyolefin, such as polypropylene and polyethylene, as a hard segment and a rubber component, such as an ethylene-propylene rubber (EPM), as a soft segment.

In general, the TPO is roughly classified into a blend type of a polyolefin and a rubber component, a dynamic crosslinking type, and a polymerization type.

Specifically, examples of the TPO include one having a structure in which an ethylene-propylene rubber (EPM) is dispersed in polypropylene; one having a structure in which a crosslinked or partially crosslinked ethylene-propylene-diene rubber (EPDM) is dispersed in polypropylene; a random copolymer of ethylene and an α-olefin; and a block copolymer of a polyethylene block and an ethylene/α-olefin copolymer block.

[Thermoplastic Styrene Elastomer]

The thermoplastic styrene elastomer (TPS) means a thermoplastic elastomer constituted of, as a hard segment, polystyrene and, as a soft segment, a conjugated diene polymer or a fully hydrogenated product or partially hydrogenated product of the polymer.

Specifically, examples of the TPS include a styrene-butadiene-styrene block copolymer (SBS), a styrene-ethylene-butylene-styrene copolymer (SEBS) that is a fully hydrogenated product of SBS, a styrene-butadiene-butylene-styrene (SBBS) that is a partially hydrogenated product of SBS, a styrene-isobutylene-styrene block copolymer (SIS), and a styrene-ethylene-propylene-styrene (SEPS) that is a fully hydrogenated product of SIS.

[Thermoplastic Urethane Elastomer]

The thermoplastic urethane elastomer (TPU) is a thermoplastic elastomer having a structure obtained through block copolymerization of a soft segment containing a long-chain polyol and a hard segment obtained through polymerization of a chain extender, such as a short-chain glycol, and a diisocyanate via a urethane bond.

In the present invention, it is preferred that the thermoplastic urethane elastomer is used as the thermoplastic elastomer. As for the thermoplastic urethane elastomer (TPU), on the occasion of expanding the TPU raw material particles, the shape of the TPU raw material particles is readily kept (hardly spheroidized), and expanded beads having a desired shape are readily obtained. Furthermore, since the expanded TPU beads are excellent in fusion bonding properties at the time in-mold molding, the expanded beads can be fusion-bonded at the time of in-mold molding even without being excessively secondarily expanded, and therefore, the in-mold molding can be performed while leaving voids among the expanded beads formed at the time of filling in a mold. On the other hand, when a secondary expansion force is given to the expanded beads at the time of in-mold filling, the size of voids among the expanded beads formed on the occasion of filling in a mold can be controlled small, too. That is, when the TPE constituting the expanded beads is TPU, it becomes easy to control the voidage of the expanded beads molded article to a desired value.

In general, the TPU includes an ester-based TPU, an ether-based TPU, and so on depending upon the kind of the long-chain polyol, and the characteristics of the resulting TPU are influenced.

Examples of the long-chain polyol that is a constitutional element of the ester-based TPU include compounds obtained through a condensation reaction between a polyhydric alcohol and a bibasic acid; and lactone-based ester polyols. Here, specific examples of the polyhydric alcohol include ethylene glycol, propylene glycol, butanediol, butenediol, hexanediol, pentanediol, neopentyl diol, and pentanediol. In addition, specific examples of the dibasic acid include adipic acid, sebacic acid, azelaic acid, terephthalic acid, isophthalic acid, and maleic acid.

Meanwhile, examples of the long-chain polyol that is a constitutional element of the ether-based TPU include polyethylene glycol, polypropylene ether glycol, polytetramethylene ether glycol, and polyhexamethylene ether glycol.

Examples of the short-chain glycol include ethylene glycol, propylene glycol, butanediol, butenediol, pentanediol, neopentyl glycol, hexanediol, cyclohexanediol, diethylene glycol, diethanolamine, and triethanolamine.

Examples of the diisocyanate include tolylene diisocyanate (TDI), diphenylmethane diisocyanate (MDI), hexamethylene diisocyanate, naphthalene diisocyanate, isophorone diisocyanate, and xylylene diisocyanate.

The constitutional element of the TPU is not particularly limited. The constitutional element of the TPU is properly selected according to physical properties required for the expanded beads molded article. As the TPU, TPU composed of a single kind selected from constitutional elements of one kind may be used, and TPU composed of two or more kinds selected from among plural constitutional elements, such as the long-chain polyol, the short-chain glycol, and the diisocyanate may be used.

Though the TPU may be either the aforementioned ether-based TPU or ester-based TPU, from the viewpoint that the resulting expanded thermoplastic polyurethane beads molded article is excellent in surface appearance and fusion bonding properties, the TPU constituting the expanded TPU beads molded article of the present invention is preferably one composed of, as a main component, the ether-based TPU, and more preferably composed of only the ether-based TPU.

The expanded beads molded article of the present invention may contain a thermoplastic resin according to the object within a range where the effects of the present invention are not impaired.

Examples of the thermoplastic resin include a polyolefin resin and a polystyrene resin. The content of such a thermoplastic resin in the polymer component constituting the expanded beads molded article is preferably 30% by weight or less, more preferably 20% by weight or less, and still more preferably 10% by weight or less. In the expanded beads molded article of the present invention, it is yet still more preferred that the polymer component is composed of only the TPE (the content of the TPE in the polymer component is 100% by weight).

In the case where TPE constituting the expanded beads molded article of the present invention is TPU, a type A durometer hardness of the polymer component containing TPU is preferably 95 or less. When the hardness is 95 or less, even when a steam pressure (molding pressure) is not excessively increased at the time of in-mold molding, an expanded beads molded article having excellent fusion bonding properties can be obtained, and therefore, secondary expansion of the expanded beads can be suppressed, and the control of the voidage of the expanded beads molded article becomes easy. The foregoing hardness is more preferably 92 or less, still more preferably 90 or less, and especially preferably 88 or less. On the other hand, though its lower limit is not particularly limited from the viewpoint of fusion bonding properties, when the hardness is excessively low, after the molded article is demolded from a mold, the molded article is liable to generate remarkable shrinkage, deformation, and so-called terrible sink depending upon the expansion condition or the shape of the expanded article. Thus, the foregoing hardness is more preferably 70 or more, still more preferably 80 or more, and especially preferably 85 or more.

In this specification, the type A durometer hardness means a durometer hardness (HDA) to be measured with a type A durometer on a basis of JIS K7215-1986.

[Characteristics of Expanded Beads Molded Article (Expanded TPE Beads Expanded Article]

The expanded beads molded article of the present invention has the following characteristics.

(Density of Expanded Beads Molded Article)

A density of the expanded beads molded article of the present invention is 150 to 300 kg/m$^3$. When the density of the molded article is less than 150 kg/m$^3$, there is a case where after compressing the expanded beads molded article, a time required for restoration of the shape before compression becomes long. On the other hand, when the density of the molded article is more than 300 kg/m$^3$, there is a case where after compressing the expanded beads molded article, a time required for restoration of the shape before compression becomes long. From the aforementioned viewpoint, the density of the expanded beads molded article is preferably 170 to 280 kg/m$^3$, and more preferably 190 to 260 kg/m$^3$.

(Voidage of Expanded Beads Molded Article)

The expanded beads molded article of the present invention has voids, and a voidage thereof is 10 to 70% by volume. When the voidage of the expanded beads molded article is less than 10% by volume, there is a case where after compressing the expanded beads molded article, a time required for restoration of the shape before compression becomes long. On the other hand, when the voidage of the expanded TPE beads molded article is more than 70% by volume, there is a case where the fusion bonding properties among the expanded beads of the expanded beads molded article become poor. From the aforementioned viewpoint, the voidage of the expanded beads molded article is preferably 13 to 65% by volume, more preferably 15 to 60% by volume, and still more preferably 20 to 50% by volume.

The voidage of the expanded beads molded article can be controlled by changing the bulkiness of the expanded beads on the occasion of filling the expanded beads in a mold by changing the shape thereof (changing a ratio of apparent density to the bulk density of the expanded beads) or controlling the secondary expandability of the expanded beads at the time of in-mold molding. In addition, in the voids of the expanded TPE beads molded article, it is preferred that the voids are interconnected with each other. In view of the fact that the expanded beads molded article has such voids, it can also be suitably used as an air-permeable material, a water-permeable material, a sound-deadening material, a cushioning material, a lightweight material, or the like.

Figure 2:
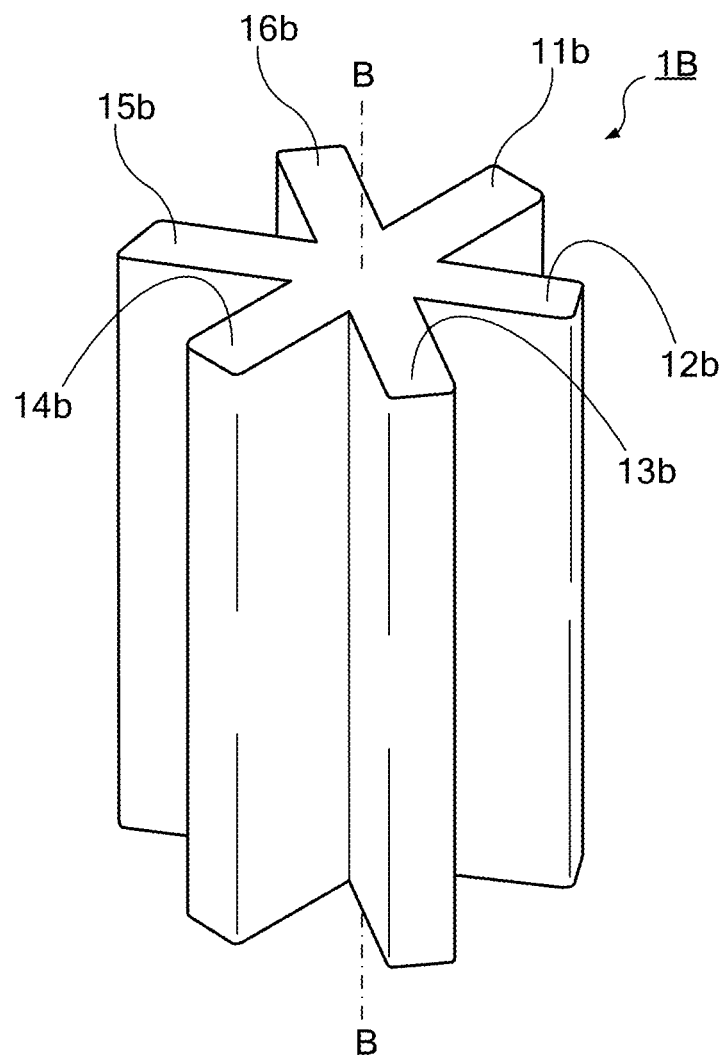
FIG. 2 is a view showing an example of a shape of an expanded bead capable of increasing a voidage of an expanded TPE beads molded article.
Figure 3:
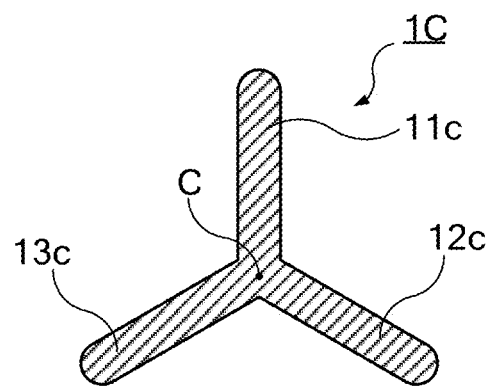
FIG. 3 is a view showing an example of a shape of an expanded bead capable of increasing a voidage of an expanded TPE beads molded article.
Figure 3:
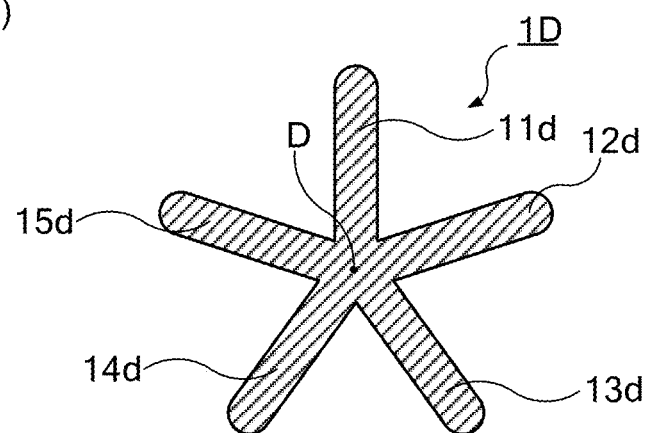
Figure 3:
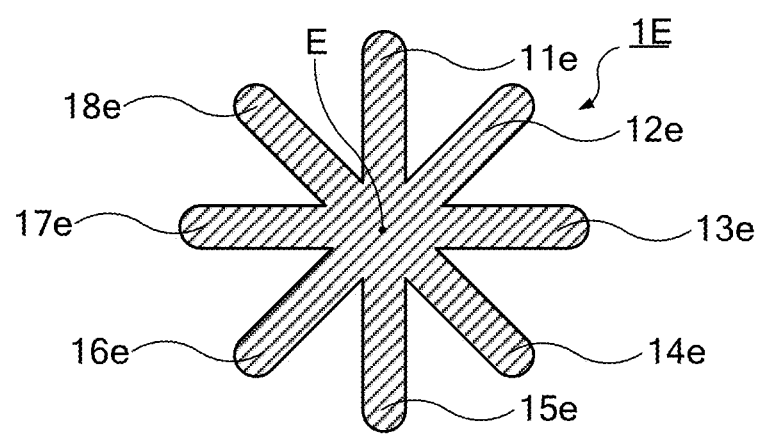
Figure 4:
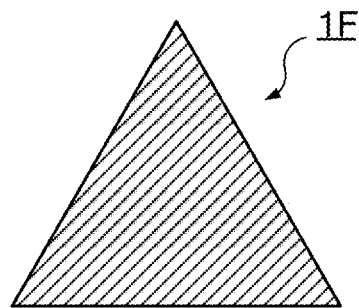
FIG. 4 is a view showing an example of a shape of an expanded bead capable of increasing a voidage of an expanded TPE beads molded article.
Figure 4:
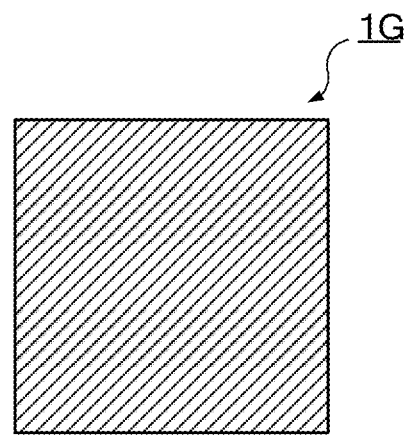
Figure 4:
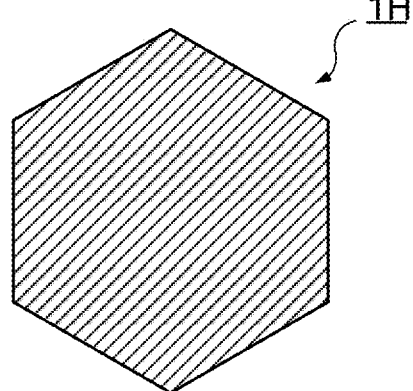
Figure 5:
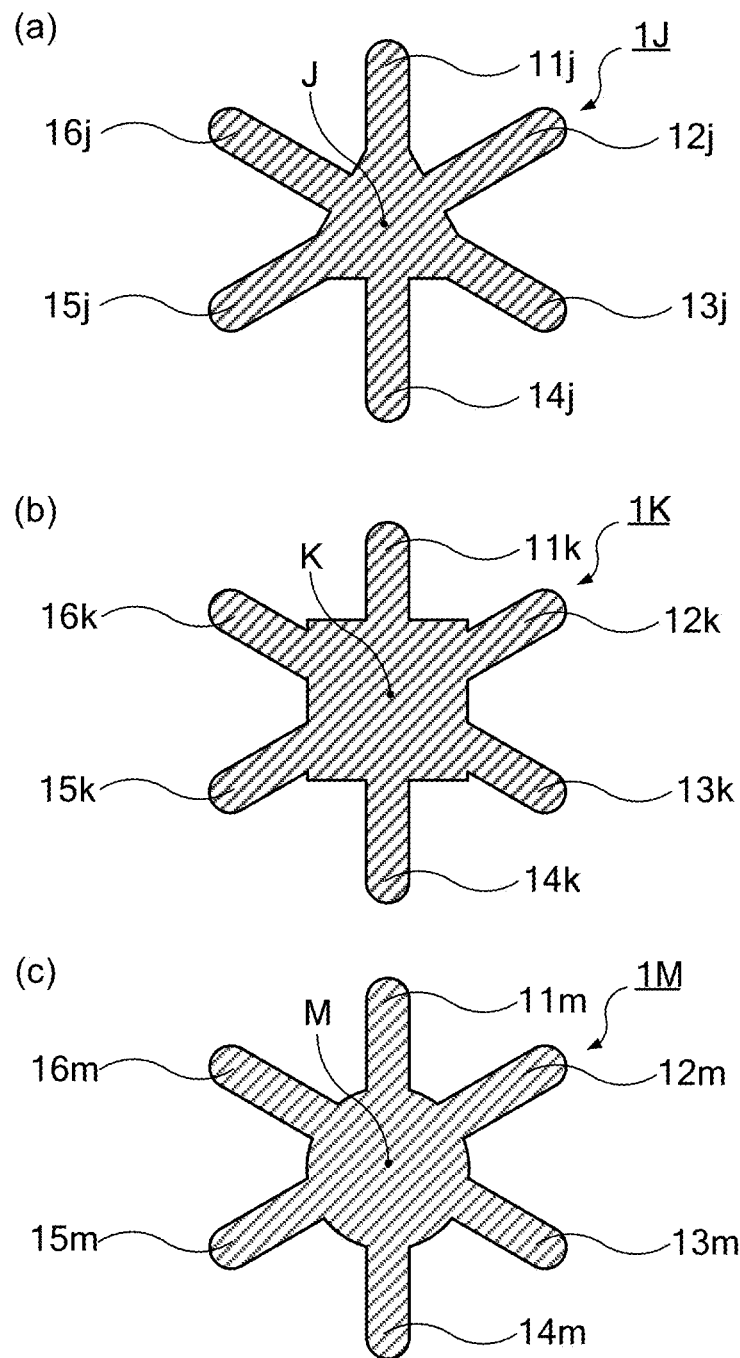
FIG. 5 is a view showing an example of a shape of an expanded bead capable of increasing a voidage of an expanded TPE beads molded article.

An example of the shape of the expanded bead which is able to increase the voidage of the expanded beads molded article is shown in FIGS. 1 to 5, respectively. FIG. 1 is a view showing an example of a columnar expanded bead in which a cross-sectional shape is a shape composed of three or more protrusions extending outwardly from an axis A and is a perspective view showing a columnar expanded bead in which a cross-sectional shape is a shape composed of four protrusions 11a to 14a extending outwardly from the axis A (hereinafter sometimes referred to as "cross shape"). In addition, FIG. 2 is also a view showing an example of a columnar expanded bead in which a cross-sectional shape is a shape composed of three or more protrusions extending outwardly from an axis A and is a perspective view showing a columnar expanded bead in which a cross-sectional shape is a shape composed of six protrusions 11b to 16b extending outwardly from the axis B (hereinafter sometimes referred to as "star shape"). The expanded bead having a shape shown in FIG. 1 or FIG. 2 can be, for example, obtained by the following manner. The TPE and a predetermined additive are fed into an extruder, and these are heat kneaded to prepare a melt kneaded material. Then, the melt kneaded material is extruded into water from small holes of a die annexed in a tip of the extruder and having a nozzle shape the same as the cross-sectional shape of desired expanded beads and cut, thereby obtaining raw material particles. Alternatively, the melt kneaded material is extruded in a strand-like form from small holes of a die annexed in a tip of the extruder and having a nozzle shape the same as the cross-sectional shape of desired expanded beads, and the strand is cooled and then cut, thereby obtaining raw material particles. By expanding the resulting raw material particles, the expanded particles having a shape shown in FIG. 1 or FIG. 2 can be obtained.

So long as the number of protrusions of the expanded bead which is able to increase the voidage of the expanded beads molded article is three or more, the expanded bead is not limited to those shown in FIGS. 1 and 2. For example, as in a columnar expanded bead 1C shown in FIG. 3 (a), the number of protrusions 11c to 13c extending outwardly from an axis C may be three in the cross-sectional shape; as in a columnar expanded bead 1D shown in FIG. 3 (b), the number of protrusions 11d to 15d extending outwardly from an axis D may be five in the cross-sectional shape; and as in a columnar expanded bead 1E shown in FIG. 3 (c), the number of protrusions 11e to 18e extending outwardly from an axis E may be eight in the cross-sectional shape. In addition, though illustration is omitted, the number of protrusions extending outwardly from the axis may also be nine or more in the cross-sectional shape of the columnar expanded bead. The number of protrusions is preferably 3 to 8, and more preferably 4 to 6 in the cross-sectional shape of the columnar expanded bead.

The expanded bead which is able to increase the voidage of the expanded beads molded article may be a columnar expanded bead in which a cross-sectional shape thereof is a polygon. For example, as in a columnar expanded bead 1F shown in FIG. 4 (a), the expanded bead may be one in which a cross-sectional shape thereof is a triangle; as in a columnar expanded bead 1G shown in FIG. 4 (b), the expanded bead may be one in which a cross-sectional shape thereof is a quadrangle; and as in a columnar expanded bead 1H shown in FIG. 4 (c), the expanded bead may be one in which a cross-sectional shape thereof is a hexagon. In addition, though illustration is omitted, the expanded bead may also be one in which a cross-sectional shape thereof is a heptagonal or more polygonal shape.

The expanded bead which is able to increase the voidage of the expanded beads molded article may be an expanded bead having a circular, ellipsoidal, or polygonal cross-sectional shape having three or more protrusions extending outwardly from the axis. For example, as in an expanded bead 1J shown in FIG. 5 (a), the columnar expanded bead may be one in which a cross-sectional shape thereof is a triangle having six protrusions 11j to 16j extending outwardly from an axis J; as in an expanded bead 1K shown in FIG. 5 (b), the columnar expanded bead may be one in which a cross-sectional shape thereof is a quadrangle having six protrusions 11k to 16k extending outwardly from an axis K; and as in an expanded bead 1M shown in FIG. 5 (c), the columnar expanded bead may be one in which a cross-sectional shape thereof is a circle having six protrusions 11m to 16m extending outwardly from an axis M. In addition, though illustration is omitted, the columnar expanded bead may be one in which a cross-sectional shape thereof is an ellipsoid, a quadrangle, a pentagon, or a polygon having seven or more edges and having 5 or 7 or more protrusions extending outwardly from the axis.

Among these expanded beads, from the viewpoint that the voidage of the expanded beads molded article can be increased, the expanded bead is preferably a columnar expanded bead having a cross-sectional shape composed of three or more protrusions extending outwardly from the axis, or a columnar expanded bead having a circular, ellipsoidal, or polygonal cross-sectional shape having three or more protrusions extending outwardly from the axis.

When the expanded beads molded article of the present invention has voids among the expanded beads, at the time when the expanded beads molded article is compressed, the voids of the expanded beads molded article are first collapsed, and according to this, collapse of cells of the expanded beads of the expanded beads molded article is suppressed. For this reason, the gas within the cells of the expanded beads molded article hardly comes out. Then, the thermoplastic elastomer hardly causes plastic deformation in a normal temperature region, and therefore, it may be considered that when the expanded beads molded article has voids, after compressing the expanded beads molded article, a time required for restoration of the shape before compression becomes short.

The density and voidage of the expanded beads molded article are determined in the following manners.

First of all, the expanded beads molded article having been allowed to stand in an environment at a temperature of 23° C. and a relative humidity of 50% for 24 hours or more is cut and divided into samples in a rectangular parallelepiped form (exclusive of a molded skin) having an appropriate size. Then, an apparent volume of each of the samples is determined from external dimensions of each of the samples, and a sum total thereof is defined as an apparent volume: H of the sample. By dividing a total weight W of the respective samples by the apparent volume H, a density [kg/m³] of the expanded beads molded article is determined.

Subsequently, the respective samples are sunk in ethanol at a temperature of 23° C. by using a tool, such as a wire net, and light vibration or the like is given, thereby removing the air existing among the expanded beads. Subsequently, taking into consideration the volume of the tool, such as a wire net, a true volume of each of the samples as read out from the level rise is measured, and the measured values are totalized and defined a true volume: I of the sample. A voidage (%) is determined from the thus determined apparent volume: H and true volume: I of the sample according to the following formula (1).

$$\text{Voidage (\% by volume)} = [(H-I)/H] \times 100 \qquad (1)$$

(Compression Set of Expanded Beads Molded Article)

A compression set of the expanded beads molded article of the present invention is preferably 7% or less, more preferably 6% or less, and still more preferably 4% or less. Though a lower limit value of the foregoing compression set is not particularly limited, it is, for example, about 0.1%. In addition, the compression set is a strain of the expanded beads molded article 30 minutes after completion of compression of the expanded beads molded article in the measurement of compression set at 23° C. on a basis of JIS K6767:1999.

When the compression set of the expanded beads molded article falls within the aforementioned range, the expanded beads molded article after compression is excellent in restorability of the shape, and therefore, it is suitable for applications, such as a seat cushioning material, a sports pad material, and a shoe sole material.

(Tensile Strength at Break of Expanded Beads Molded Article)

A tensile strength at break of the expanded beads molded article of the present invention is preferably 0.1 MPa or more. So long as the tensile strength at break of the expanded beads molded article is 0.1 MPa or more, it is suggested that the fusion bonding properties among the expanded beads of the expanded beads molded article are favorable, and the expanded beads molded article is excellent in durability and can be applied to applications, such as a seat cushioning material, a sports pad material, a sole (shoe sole) member, and an insole material. From the aforementioned viewpoint, the tensile strength at break of the expanded beads molded article is more preferably 0.3 MPa or more, still more preferably 0.4 MPa or more, and especially preferably 0.5 MPa or more. Though an upper limit thereof is not particularly limited, it is in general about 3.0 MPa. The tensile strength at break of the expanded beads molded article can be measured in conformity with JIS K6767:1999.

(Rebound Resilience of Expanded Beads Molded Article)

A rebound resilience of the expanded beads molded article of the present invention is preferably 50% or more. When the rebound resilience of the expanded beads molded article is less than 50%, there is a concern that an expanded beads molded article with excellent rebound properties, which is used for a sole member or the like, is hardly obtained. From the aforementioned viewpoint, the rebound resilience of the expanded beads molded article is more preferably 50 to 85%, and still more preferably 54 to 85%.

The rebound resilience of the expanded beads molded article can be measured on a basis of JIS K6255:2013.

A rebound resilience of the thermoplastic elastomer constituting the expanded beads molded article of the present invention is preferably 30 to 50%. Typically, in order that after compressing the molded article, a time required for restoration of the shape before compression may be made short, it is needed to make the rebound resilience of the molded article high. However, in the case of the expanded beads molded article of the present invention, even when the rebound resilience of the thermoplastic elastomer constituting the molded article is low, after compressing the molded article, a time required for restoration of the shape before compression is short. The modulus of repulsion elasticity of the thermoplastic elastomer constituting the molded article can be measured in conformity with JIS K6255:2013.

A sample for test can be prepared in the following manner. First of all, raw material particles are heat-pressed at 200° C. to prepare a sheet having a thickness of 12.5 mm. Subsequently, a sample having a length of 30 mm, a width of 30 mm, and a thickness of 12.5 mm is cut out from the center of the sheet. As a measurement apparatus, a Schob type rebound tester "RT-90" (manufactured by Kobunshi Keiki Co., Ltd.) or the like can be used.

(Closed Cell Ratio of Expanded Beads Molded Article)

A closed cell ratio of the expanded beads molded article of the present invention is preferably 60% or more. When the closed cell ratio of the expanded beads molded article is 60% or more, the respective cells are independently formed, and therefore, the rebound properties to an external force are much more readily exhibited. An upper limit of the closed cell ratio of the expanded beads molded article is 100%. From the aforementioned viewpoint, the closed cell ratio of the expanded beads molded article is more preferably 70 to 100%, and still more preferably 80 to 100%. The closed cell ratio of the expanded beads molded article means a ratio of a volume of the closed cells to a volume of cells contained in the expanded beads constituting the expanded beads molded article (a sum total of the volume of closed cells and the volume of open cells), and can be determined with an air pycnometer "930" (manufactured by Toshiba Beckman Co., Ltd.) in conformity with Procedures C described in ASTM-D2856-70.

(Surface Hardness of Expanded TPE Beads Molded Article)

A surface hardness of the expanded beads molded article of the present invention is preferably 15 to 50, and more preferably 20 to 45 in terms of a type C durometer hardness. When the type C durometer hardness falls within this range, an expanded beads molded article provided with characteristics rich in cushioning properties and elastic restorability can be obtained. The type C durometer hardness means a durometer hardness to be measured with a type C durometer on a basis of JIS K7312:1996.

(Tensile Elongation of Expanded Beads Molded Article)

A tensile elongation of the expanded beads molded article of the present invention is preferably 50% or more. When the tensile elongation of the expanded beads molded article of the present invention is 50% or more, the expanded beads molded article is favorable in fusion bonding properties among the expanded beads and can be applied to applications, such as a seat cushioning material, a sports pad material, and a shoe sole material. From the aforementioned viewpoint, the tensile elongation of the expanded beads molded article is more preferably 60% or more, and still more preferably 70% or more. An upper limit of the tensile elongation of the expanded TPU beads molded article is in general 500%, preferably 400%, and more preferably 300%. The tensile elongation of the expanded beads molded article can be measured on a basis of JIS K6767:1999.

(Compression Characteristics of Expanded Beads Molded Article)

In the expanded beads molded article of the present invention, a ratio of a compression stress at the time of 50% strain to a compression stress at the time of 5% strain is preferably 8.0 or more. In view of the fact that the expanded beads molded article of the present invention has voids among the expanded beads, and the voidage is 10% by volume or more, the compression stress at the initial stage of compression, for example, at the time of 5% strain becomes small, and the compression stress at the latter stage, for example, at the time of 50% strain becomes the same degree, as compared with an expanded beads molded article in which voids do not substantially exist, and the voidage is less than 10% by volume. According to this, not only the shape of the expanded beads molded article of the present invention after compression is restored within a short time, but also when used as sports goods, automobile members, and so on, the expanded beads molded article of the present invention is flexible at the time of low compression, whereas at the time of high compression, it is able to respond to the same stress as in an expanded beads molded article having a voidage of less than 10% by volume, and therefore, it becomes possible to give comfortability and excellent texture while exhibiting the same rebound characteristics as in the conventional products.

[Production Method of Expanded Thermoplastic Elastomer Beads Molded Article (Expanded Beads Molded Article)]

An example of the production method of the expanded beads molded article of the present invention is hereunder described. The expanded beads molded article of the present invention is produced by producing expanded thermoplastic elastomer beads (expanded TPE beads) and subjecting the produced expanded TPE beads to in-mold molding.

(Production Method of Expanded Thermoplastic Elastomer Beads (Expanded TPE Beads)

Though a production method of expanded TPE beads to be used for production of the expanded beads molded article of the present invention is not particularly limited, it is preferred to include the following step (1) and step (2):

Step (1): an impregnation step of impregnating a blowing agent in raw material particles containing TPE; and Step (2): an expansion step of expanding the raw material particles containing the blowing agent, to obtain expanded TPE beads.

A melt flow rate (MFR) at 190° C. under a load of 10 kg of the raw material particles is preferably 0.1 to 40 g/10 min. In view of the fact that the MFR of the raw material particles is 0.1 to 40 g/10 min, the expanded TPE beads are readily produced. The MFR of the raw material particles is more preferably 5 to 35 g/10 min, and still more preferably 10 to 30 g/10 min. In the present invention, the melt flow rate is a value measured under a condition at a temperature of 190° C. under a load of 10 kg on a basis of JIS K7210-2:2014. A water content of a measurement sample is regulated to 500 ppm or less.

The raw material particles can be properly blended with, in addition to the polymer component, various additives which are typically used, such as a cell controlling agent, an antistatic agent, an electrical conductivity imparting agent, a lubricant, an antioxidant, a UV absorbing agent, a flame retardant, a metal deactivator, a colorant (e.g., a pigment and a dye), a crystal nucleus agent, and a filler, as the need arises.

Examples of the cell controlling agent include inorganic cell controlling agents, such as talc, sodium chloride, calcium carbonate, silica, titanium oxide, gypsum, zeolite, borax, aluminum hydroxide, and carbon; and organic cell controlling agents, such as a phosphate-based compound, a phenol-based compound, an amine-based compound, and polytetrafluoroethylene (PTFE). The cell controlling agent is preferably talc.

The addition amount of the cell controlling agent is preferably 0.5 parts by weight or less, more preferably 0.2 parts by weight or less, still more preferably 0.1 parts by weight or less, and especially preferably 0.08 parts by weight or less based on 100 parts by weight of the polymer component.

The raw material particles are not particularly limited with respect to the production method and can be obtained by a known method. For example, the raw material particles can be obtained by a strand cutting method in which the polymer component containing TPE and optionally, additives, such as a cell controlling agent, are fed into an extruder and kneaded to prepare a melt kneaded product, the melt kneaded product is extruded into a strand-like form from small holes of a die annexed in a tip of the extruder, and the extruded melt is then cut in a predetermined weight by a pelletizer; a hot cutting method in which the aforementioned melt kneaded product immediately after extrusion into a gas phase is cut; or an underwater cutting method in which the aforementioned melt kneaded product is extruded into water and immediately after extrusion, cut in a predetermined weight. The shape of the small holes of the die is properly selected on a basis of the shape of the target expanded beads.

In the case of producing the raw material particles by using an extruder, the TPE is decomposed within the extruder, thereby occasionally causing an increase of its MFR. Therefore, in order to adjust the MFR of the raw material particles to the aforementioned range, as the raw material TPE to be fed into the extruder, it is preferred to use a raw material TPE having an MFR at 190° C. under a load of 10 kg of 30 g/10 min or less. A lower limit of the MFR is about 0.1 g/10 min.

The step (1) is an impregnation step of impregnating a blowing agent in the raw material particles. Though the impregnation method of a blowing agent in the raw material particles is not particularly limited, it is preferred that the raw material particles containing the TPE are dispersed in a dispersing medium within a pressurizable closed vessel, such as an autoclave, and the blowing agent is impregnated in the raw material particles.

Examples of the dispersing medium include aqueous media, such as an alcohol having 3 or less carbon atoms, water, and a mixture thereof, and typically, water is used.

In the dispersing medium, it is preferred to add a dispersant, such as a sparingly water-soluble inorganic material, e.g., aluminum oxide, tricalcium phosphate, magnesium pyrophosphate, zinc oxide, kaolin, mica, and talc, as the need arises. In addition, a dispersing aid, such as an anionic surfactant, e.g., sodium dodecylbenzenesulfonate and a sodium alkanesulfonate, can also be added in the dispersing medium.

It is preferred to add the dispersant such that a weight ratio of the raw material particles to the dispersant ((resin particles)/(dispersant)) is 20 to 2,000. The lower limit of the weight ratio of the raw material particles to the dispersant is more preferably 30, and the upper limit thereof is more preferably 1,000. In addition, a weight ratio of the dispersant to the dispersing aid ((dispersant)/(dispersing aid)) is preferably 1 to 500. The upper limit of the weight ratio of the dispersant to the dispersing aid is more preferably 100.

As the blowing agent, a physical blowing agent and a chemical blowing agent can be used, and these can also be used in combination.

Examples of the physical blowing agent include an organic physical blowing agent and an inorganic physical blowing agent.

Examples of the organic physical blowing agent include aliphatic hydrocarbons, such as propane, butane, hexane, pentane, and heptane; alicyclic hydrocarbons, such as cyclobutane and cyclohexane; halogenated hydrocarbons, such as chlorofluoromethane, trifluoromethane, 1,1-difluoroethane, 1,1,1,2-tetrafluoroethane, methyl chloride, ethyl chloride, and methylene chloride; and dialkyl ethers, such as dimethyl ether, diethyl ether, and methyl ethyl ether. In addition, examples of the inorganic physical blowing agent include carbon dioxide, nitrogen, argon, air, and water. These can be used alone or in combination of two or more thereof.

It is preferred to use carbon dioxide as the blowing agent. By using carbon dioxide, the expanded TPE beads are readily produced.

A blending ratio of carbon dioxide in the blowing agent is preferably 50 to 100% by weight. The lower limit of the blending ratio of carbon dioxide in the blowing agent is more preferably 70% by weight, and still more preferably 90% by weight. The blending ratio of carbon dioxide in the blowing agent is most preferably 100% by weight.

The use amount of the blowing agent is properly set taking into account the apparent density of the target expanded beads, the kind of the TPE, and the like. Typically, the use amount of the blowing agent is preferably 0.5 to 30 parts by weight based on 100 parts by weight of the raw material particles.

In order to thoroughly impregnate the blowing agent in the raw material particles within a short time, it is preferred to undergo the step (1) under pressure.

The pressure (impregnation pressure) within the closed vessel in the step (1) is preferably 0.5 to 7.0 MPa in terms of a gauge pressure from the viewpoint of not only thoroughly impregnating the blowing agent in the raw material particles but also suppressing refinement of the cells of the resulting expanded beads. A unit of the pressure as the gauge pressure is hereinafter expressed as "MPa (G)".

From the viewpoint of suppressing the ununiformity in the cell diameter of the resulting expanded beads, the impregnation pressure is more preferably 1.0 MPa (G) or more, still more preferably 2.0 MPa (G) or more, and especially preferably 2.6 MPa (G) or more. Meanwhile, from the viewpoint of readily controlling an expansion pressure as mentioned later, the impregnation pressure is more preferably 5.0 MPa (G) or less, and still more preferably 4.5 MPa (G) or less.

From the viewpoint of thoroughly impregnating the blowing agent in the raw material particles within a short time, it is preferred to perform the impregnation of the physical blowing agent in the raw material particles under heating.

A temperature (impregnation temperature) of the contents within the closed vessel on the occasion of impregnating the blowing agent in the raw material particles is preferably 20° C. or higher, and more preferably (Tm−45° C.) to (Tm−20° C.) relative to a melting temperature Tm of the raw material particles.

In this specification, the melting temperature is a value determined in the following manner. That is, by adopting, as conditioning of a test piece, "For Measurement of Melting Temperature after a Definite Heat Treatment" (all of a heating rate and a cooling rate in conditioning of a test piece are set to 10° C./min) on a basis of JIS K7121:1987, the melting temperature is determined as a melting peak temperature of the melting peak of a DSC curve obtained at a heating rate of 10° C./min by the heat flux differential scanning calorimetry. In order to reset a change of the crystal state generated in the TPE by a thermal history, the temperature is raised to 230° C. at the time of heat treatment for the aforementioned conditioning. In addition, in the case where the DSC curves has plural melting peaks, the melting peak temperature of the melting peak on the highest temperature side is adopted as the melting temperature.

In the step (1), a heating time (impregnation time) at the impregnation temperature is properly set according to the pressure within the closed vessel, the kind of the TPE, the weight of the raw material particles, and so on. In particular, from the viewpoint of productivity of the expanded TPE beads, the impregnation time is preferably 0.05 to 3 hours, and more preferably 0.1 to 1 hour.

According to the foregoing, the blowing agent is impregnated in the raw material particles, and the raw material particles containing the blowing agent are obtained. While the production method of raw material particles containing the blowing agent has been described with reference to the method of impregnating the blowing agent in the raw material particles, on the occasion of producing the raw material particles, the raw material particles containing the blowing agent can also be obtained by extruding a melt kneaded product obtained through kneading of the TPE raw material and the blowing agent within an extruder and cutting this in a desired weight by the aforementioned method.

[Step (2)]

The step (2) is an expansion step of expanding the raw material particles to obtain expanded TPE beads. Though the expansion method of the raw material particles is not particularly limited, it is preferred that subsequent to the step (1), the raw material particles containing the blowing agent are released together with the dispersing medium from the closed vessel into an atmosphere of a lower pressure than the internal pressure of the closed vessel and expanded, thereby obtaining the expanded TPE beads.

A temperature of the contents within the closed vessel when releasing the raw material particles is sometimes referred to as an expansion temperature, and a pressure within the closed vessel when releasing the raw material particles is sometimes referred to as an expansion pressure.

The expansion temperature is preferably (Tm−50° C.) to (Tm−10° C.) relative to a melting temperature Tm (° C.) of the raw material particles, and the expansion pressure is preferably 2.0 to 7.0 MPa (G).

By adopting the aforementioned expansion method and setting the expansion temperature to (Tm−50° C.) to (Tm−10° C.) and the expansion pressure to 2.0 to 7.0 MPa (G), respectively, the expanded TPE beads are readily produced.

The expansion temperature is more preferably (Tm−45° C.) to (Tm−15° C.), and still more preferably (Tm−40° C.) to (Tm−20° C.).

The lower limit of the expansion pressure is more preferably 2.6 MPa (G). Meanwhile, the upper limit of the expansion pressure is more preferably 5.0 MPa (G), and still more preferably 4.5 MPa (G).

On the occasion of releasing the raw material particles containing the blowing agent from the closed vessel, it is preferred to keep the pressure within the opened closed vessel at a fixed level through pressurization with carbon dioxide, air, or the like, or to regulate the pressure so as to increase it step-by-step. According to such pressure regulation, ununiformity in the apparent density or cell diameter of the resulting expanded beads can be minimized.

The expanded TPE beads are liable to cause excessive shrinkage after production (after expansion) especially when expanded at a high expansion ratio (low apparent density). This shrinkage is caused due to the matter that the inside of the cell becomes in a reduced pressure state when the high-temperature gas existent in the cell of the expanded bead is cooled or dissipated outside of the expanded bead. In particular, the carbon dioxide is fast in a dissipation rate into the outside of the expanded bead, and therefore, shrinkage of the expanded bead is liable to be caused. In such a case, for example, it is preferred that the expanded beads after expansion are pressurized with air and then aged in a stable state under atmospheric pressure, thereby restoring the shrunk expanded beads. Specifically, the resulting expanded beads are put into a closed vessel and pressurized with compressed air of 0.05 to 0.6 MPa (G) at 0 to 60° C. for 1 to 24 hours.

Thereafter, the pressure of the closed vessel is released, and the expanded beads are allowed to stand under atmospheric pressure at 30 to 80° C. for 12 to 72 hours.

In the case where it is contemplated to make the expansion ratio of the thus obtained expanded beads higher, two-stage expansion may be performed, as the need arises. For example, expanded beads having a lower apparent density can be obtained by heating expanded beads in which the pressure within the cells has been increased through by pressurization by using steam, heated air, or the like, or other means.

By expanding raw material particles having the same shape as the shape of the target expanded beads, the shape of the target expanded beads can be obtained. Among thermoplastic elastomers, as for the TPU, the shape of the raw material particles is readily kept at the time of expansion, and the expanded TPE beads having a desired shape is readily obtained, and therefore, it is preferred to use the TPU as the thermoplastic elastomer.

A bulk density of the expanded TPE expanded beads for obtaining the expanded beads molded article of the present invention is preferably 50 to 200 kg/m$^3$, and more preferably 70 to 180 kg/m$^3$. In addition, a ratio of the apparent density to the bulk density of the expanded TPE beads is preferably 2.0 or more, and more preferably 2.2 or more. In the case of expanded beads constituted of a general thermoplastic resin as a base material resin, when the shape of the expanded beads is spherical, and the bead diameter thereof is uniform, the foregoing ratio is in general about 1.6. In the case of expanded beads constituted of TPE as a base material, the expanded beads become hard to slip, the aforementioned ratio is about 1.8. The matter that the foregoing ratio falls within the aforementioned range means that on the occasion of filling the expanded beads in a mold, a ratio of voids among the expanded beads becomes large, and it becomes easier to control the voidage of the expanded beads molded article. An upper limit of the foregoing ratio is in general preferably about 3.0, and more preferably 2.8.

The bulk density of the expanded TPE beads can be determined in the following manner. The expanded beads are filled in a vessel, such as a graduated measuring cylinder, by means of free fall, the vessel is then vibrated, and a scale when the volume thereof reaches a constant volume is read, thereby determining a bulk volume of the expanded beads. By dividing a whole weight of the expanded beads filled in the vessel by the bulk volume, the bulk density of the expanded TPE beads can be determined.

The apparent density of the expanded TPE beads can be determined in the following manner. The expanded TPE beads having an arbitrary amount are collected, and a weight thereof is measured. An apparent volume of the expanded TPE beads, of which the weight has been measured, is determined by the water immersion method, and by dividing the weight of the expanded TPE beads by the apparent volume, the apparent density of the expanded TPE beads can be determined.

(In-Mold Molding of Expanded TPE Beads)

The in-mold molding method for obtaining the expanded beads molded article of the present invention is not particularly limited, and a molded article having a desired form can be obtained by a known method. For example, the following methods are exemplified.

First of all, the expanded TPE beads are filled in a mold which is possible for heating and cooling and is able to be opened or closed and hermetically sealed. Preferably, a saturated water vapor having a saturated vapor pressure of 0.05 to 0.48 MPa (G) (maximum value of the saturated vapor pressure of water vapor to be fed into the mold: molding pressure) is then fed into the mold, and the expanded beads are heated within the mold to mutually fuse the expanded beads, thereby forming an expanded beads molded article.

The molding pressure is more preferably 0.08 to 0.42 MPa (G).

Subsequently, this expanded beads molded article is cooled and then taken out from the mold. The expanded TPE beads molded article can be produced by adopting such a batch-type in-mold molding method (see, for example, JP 4-46217 B and JP 6-49795 B).

The expanded beads molded article can also be produced by a continuous molding method (see, for example, JP 9-104026 A, JP 9-104027 A, and JP 10-180888 A).

As a method of filling the expanded beads in a mold, a known method can be adopted. In addition, within a range where the secondary expansion force of the expanded beads is not excessively enhanced, for example, a method in which the expanded beads are pressurized with a pressurized gas, a predetermined internal pressure is given to the expanded beads, and the resulting expanded beads are then filled in the mold (pressurization filling method); a method in which the expanded beads in a compressed state with a pressurized gas are filled in a pressurized mold, and the pressure within the mold is then released (compression filling method); a method in which prior to filling the expanded beads in a mold, the mold is opened in advance to broaden a molding space, and after filling, the mold is closed to mechanically compress the expanded beads (cracking filling method); and so on can also be adopted.

As for the heating method with a saturated water vapor in the in-mold molding method, heating methods, such as one-direction flow heating, reversed one-direction flow heating, and main heating, can be properly combined according to a known method.

The one-direction flow heating means a method in which a heating medium is fed from either one mold side of a male mold or a female mold to heat the expanded beads, and subsequently, the heating medium is ejected from the other mold side. In addition, the case where the mold into which the heating medium is fed and the mold from which the heating medium is ejected are opposite to those of the case of the aforementioned one-direction flow heating refers to the "reversed one-direction flow heating".

By subjecting the expanded beads having a predetermined shape to in-mold molding, an expanded beads molded article having a voidage of 10 to 70% by volume, preferably 13 to 65% by volume, more preferably 15 to 60% by volume, and still more preferably 20 to 50% by volume can be obtained.

Among the expanded TPE beads, since the expanded TPU beads are also excellent in fusion bonding properties at the time of in-mold molding, the expanded beads can be fusion bonded at the time of in-mold molding without being excessively secondarily expanded, and therefore, the in-mold molding can be performed while leaving the voids among the expanded beads formed at the time of filling in the mold. Meanwhile, when a secondary expansion force is given to the expanded beads at the time of in-molding filling, the size of the voids among the expanded beads on the occasion of filling in the mold can be controlled to a small level. That is, when the TPE constituting the expanded beads is the TPU, it becomes easy to control the voidage of the expanded beads molded article to a desired value.

EXAMPLES

The present invention is hereunder described in more detail by reference to Examples, but it should be construed that the present invention is not limited thereto.

Examples 1 to 5 and Comparative Examples 1 to 3

1. Raw Material Components

The following components were used as the raw material TPE and additive to be used for raw material particles.

[Raw Material TPE]

TPE: Ether-based thermoplastic polyurethane (TPU) (manufactured by Covestro AG, a grade name: DP9385A, melt flow rate (MFR) [at 190° C. under a load of 10 kg]: 4 g/10 min, type A durometer hardness (HDA): 86, melting temperature: 165° C., density: 1.12 g/cm$^3$)

Cell controlling agent: Talc (manufactured by Hayashi Kasei Co., Ltd., a grade name: KHP-125B, d50: 7 μm)

2. Production of Raw Material Particles

The TPE and the cell controlling agent (talc) in an amount shown in Table 1 based on 100 parts by weight of the TPE were fed into a twin-screw extruder having an inside diameter of 26 mm, and these were heat kneaded to prepare a melt kneaded product. The melt kneaded product was extruded into water from small holes of a die annexed in a tip of the extruder and cut, thereby obtaining raw material particles having a cross-sectional shape, an average particle weight [mg], and an average L/D as shown in Table 1.

The shape of the small holes of the die was changed depending upon a cross-sectional shape of the target expanded beads. With respect to the raw material particles for obtaining columnar expanded beads having a cross section in a cross shape, the outlet shape of the small holes of the die was formed in a cross shape; with respect to the raw material particles for obtaining columnar expanded beads having a cross section in a star shape, the outlet shape of the small holes of the die was formed in a star shape; and with respect to the raw material particles for obtaining columnar expanded beads having a cross section in a circular shape, the outlet shape of the small holes of the die was formed in a circular shape. In addition, 100 raw material particles were randomly selected from the resulting raw material particles, a total weight thereof was measured, and the foregoing weight was divided by 100, thereby determining an average weight of the raw material particles. In addition, 10 raw material particles were randomly selected from the resulting raw material particles; a length (L) in the extrusion direction and a maximum diameter (D) in the cross section orthogonal to the extrusion direction of each of the selected raw material particles were measured, to determine L/D, respectively; and these values were arithmetically averaged, thereby defining the L/D of the raw material particles.

3. Production of Expanded Beads

[Step (1)]

1 kg of the raw material particles and 3 liters of water as a dispersing medium were charged in a 5-liter autoclave equipped with a stirrer, and 0.5 parts by weight of kaolin as a dispersant and 0.004 parts by weight of a sodium alkylbenzenesulfonate as a surfactant based on 100 parts by weight of the raw material particles were further added to the dispersing medium.

The temperature was raised while stirring the contents within the autoclave; after the temperature of the contents reached a temperature (impregnation temperature) shown in Table 1, carbon dioxide as a blowing agent was fed under pressure into the autoclave until the pressure reached a pressure (impregnation pressure) shown in Table 1; and after reaching a predetermined pressure, the resultant was kept at that temperature for 15 minutes while continuing the pressurization with carbon dioxide to maintain the pressure.

[Step (2)]

Thereafter, the stirring was stopped, a back pressure with nitrogen was applied, and the raw material particles containing the blowing agent were released together with the dispersing medium under atmospheric pressure (0.1 MPa) at a temperature (expansion temperature) of the contents within the autoclave as shown in Table 1 while regulating the pressure within the vessel in terms of a pressure (expansion pressure) as shown in Table 1 in a fixed level, thereby foaming and expanding the raw material particles to obtain expanded beads.

The obtained expanded beads were dried under atmospheric pressure at 40° C. for 24 hours, then put into a closed vessel, and pressurized with compressed air of 0.3 MPa (G) at 30° C. for 12 hours. Thereafter, the pressure was released, and the resultant was allowed to stand under atmospheric pressure at 40° C. for 24 hours.

Figure 6:
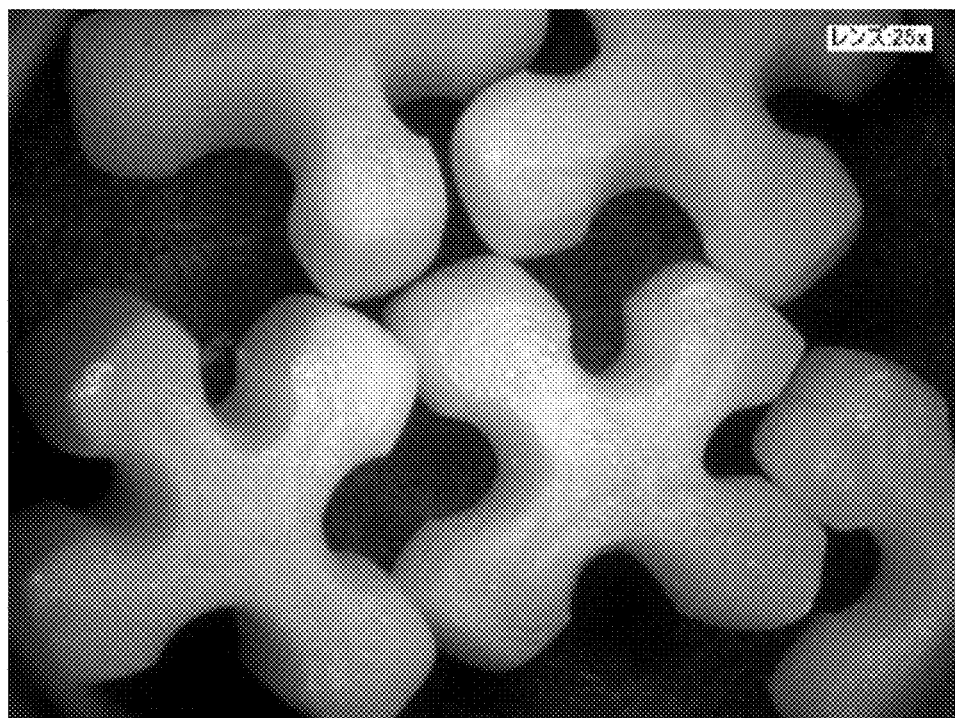
FIG. 6 is a microscopic photograph of expanded beads having a cross-sectional shape in a cross shape, as used in the production of an expanded beads molded article of Example 1.
Figure 7:
FIG. 7 is a microscopic photograph of expanded beads having a cross-sectional shape in a cross shape, as used in the production of an expanded beads molded article of Example 2.
Figure 8:
FIG. 8 is a microscopic photograph of expanded beads having a cross-sectional shape in a star shape, as used in the production of an expanded beads molded article of each of Examples 3 to 5.

Examples of the shapes of the resulting expanded beads are shown in FIGS. 6 to 8. FIG. 6 is a microscopic photograph of expanded beads having a cross-sectional shape in a cross shape, as used in the production of an expanded beads molded article of Example 1; FIG. 7 is a microscopic photograph of expanded beads having a cross-sectional shape in a cross shape, as used in the production of an expanded beads molded article of Example 2; and FIG. 8 is a microscopic photograph of expanded beads having a cross-sectional shape in a star shape, as used in the production of an expanded beads molded article of each of Examples 3 to 5. In addition, an apparent density, a bulk density, and a ratio of an apparent density to a bulk density of the resulting expanded beads are shown in Table 1. The expanded beads were conditioned at 23° C. under atmospheric pressure in an atmosphere at a relative humidity of 50% for 240 hours, followed by measuring the apparent density and the bulk density of the expanded beads.

(Apparent Density)

First of all, 50 mL of water was put into a 100-mL graduated measuring cylinder at a temperature of 23° C. Subsequently, a weight (W1) of an expanded beads group having a bulk volume of about 30 mL was measured, and then, the expanded beads group was sunk in water within the graduated measuring cylinder by using a wire net. Then, taking into consideration the volume of the wire net, an apparent volume V1 of the expanded beads group as read out from the level rise was measured. By dividing the weight W1 [kg] of the expanded beads group by the apparent volume V1 [m$^3$] (W1/V1), an apparent density [kg/m$^3$] of the expanded particles was determined.

(Bulk Density)

First of all, a 100-mL graduated measuring cylinder was prepared. Subsequently, the expanded beads were filled in the graduated measuring cylinder to an extent close to a scale of 100 mL by means of free fall, the vessel was then vibrated, and a scale when the volume thereof reached a constant volume was read, thereby determining a bulk volume V2 [m$^3$] of the expanded beads. Then, a total weight W2 [kg] of the expanded beads filled in the graduated measuring cylinder was measured and divided by the bulk volume V2 [m$^3$], thereby determining a bulk density [kg/me] of the expanded beads.

4. Production of Expanded Beads Molded Article

The expanded beads prepared above were filled in a mold for flat plate molding having a rectangular parallelepiped shape and having a length of 200 mm, a width of 65 mm, and a thickness of 33 mm by the cracking filling method and heated with a steam until reaching a molding pressure shown in Table 1. Then, after cooling, a molded article was taken out from the mold, thereby obtaining an expanded beads molded article in a plate shape. At the time of filling the expanded beads, the expanded beads were filled in a state of opening the mold from the state of completely closing the mold, such that it became larger by a cracking (%) shown in Table 1 than a volume of the space of the rectangular parallelepiped having a length of 200 mm, a width of 65 mm, and a thickness of 33 mm (for example, in the case that the cracking was 50%, the expanded beads were filled in a molding space in a state of opening the mold, such that the length in the thickness direction of the molding space became 49.5 mm from 33 mm), and after completion of filling, the mold was completely closed to compress the expanded beads, thereby mechanically giving a secondary expansion force to the expanded beads.

The density of the obtained expanded beads molded article is shown in Table 1. Furthermore, a shrinkage factor, fusion bonding properties, a voidage, a compression set, and a tensile strength at break of the obtained expanded beads molded article are shown in Table 1. These were measured after conditioning the expanded beads molded article under atmospheric pressure in an atmosphere at 23° C. and a relative humidity of 50% for 48 hours.

(1) Shrinkage Factor of Expanded Beads Molded Article

The shrinkage factor of the expanded beads molded article was calculated according to the following formula.

(Shrinkage factor (%))=[200 [mm]−(Longitudinal Length of molded article [mm])]/200 [mm]×100

(2) Fusion Bonding Properties of Expanded Beads Molded Article

When the expanded beads molded article was folded at 180° centering on a position bisecting the length in the longitudinal direction, thereby bringing the both ends of the expanded beads molded article into contact with each other, an expanded beads molded article which was not broken was evaluated as one with good adhesiveness (A). On the other hand, an expanded beads molded article which was broken was evaluated as one with poor adhesiveness (B).

(3) Density and Voidage of Expanded Beads Molded Article

A rectangular parallelepiped sample having dimensions of 170 mm×50 mm×25 mm was then cut out from the expanded beads molded article. At that time, a skin formed at the time of molding (molded skin) was removed, and an apparent volume: H of the sample was determined from the outside dimensions of the sample. A weight: W of the sample was measured, and a value obtained by dividing the weight: W by the apparent volume: H of the sample was defined as a density [kg/m$^3$] of the expanded beads molded article.

Subsequently, the sample was divided into eight divided parts in a rectangular parallelepiped form of 85 mm×25 mm×12.5 mm; the respective samples were sunk in a glass-made graduated measuring cylinder having a capacity of 200 mL and having approximately 120 mL of ethanol charged therein at a temperature of 23° C. by using a wire net; light vibration or the like was given, thereby removing the air existing among the expanded beads; taking into consideration the volume of the wire net, a true volume of each of the samples was measured from the level rise; and the measured values were totalized to determine a true volume: I of the sample. A voidage determined from the thus determined apparent volume: H and true volume: I of the sample according to the following formula (1) was defined as a voidage [% by volume] of the expanded beads molded article.

$$\text{Voidage (\% by volume)} = [(H-I)/H] \times 100 \quad (1)$$

(4) Compression Set of Expanded Beads Molded Article

Three test pieces were cut out from the expanded beads molded article into a rectangular parallelepiped form having a length of 50 mm, a width of 50 mm, and a thickness of 25 mm. At that time, a molded skin was removed. Each of the test pieces was used and allowed to stand in a state of being compressed at 25% in the thickness direction in an environment at a temperature of 23° C. and a relative humidity of 50% for 22 hours on a basis of JIS K6767:1999. 30 minutes and 24 hours after completion of compression (after releasing the jig), a thickness was measured, a compression set (%) of each of the test pieces was determined, and an arithmetic average value thereof was defined as the compression set (%).

(5) Tensile Strength at Break and Tensile Elongation of Expanded Beads Molded Article Using a vertical slicer, a rectangular parallelepiped form of 120 mm×25 mm×10 mm was out from the expanded beads molded article. At that time, a molded skin was removed such that all the surfaces thereof were cut surfaces. Furthermore, from the rectangular parallelepiped, a No. 1 dumbbell form (having a measurement portion having a length of 40 mm, a width of 10 mm, and a thickness of 10 mm) was cut out with a jig saw and used as a test piece. The test piece was subjected to a tensile test at a test speed of 500 mm/min on a basis of JIS K6767:1999, thereby measuring a tensile strength at break and a tensile elongation of the expanded beads molded article.

(6) Rebound Resilience of Expanded Beads Molded Article

Using a Schob type rebound tester "RT-90" (manufactured by Kobunshi Keiki Co., Ltd.) as a measurement apparatus, a rebound resilience of the expanded beads molded article was measured under a condition at a relative humidity of 50% and at 23° C. on a basis of JIS K6255:2013. First of all, a sample in a rectangular parallelepiped form having a length of 30 mm, a width of 30 mm, and a thickness of 25 mm was cut out from the center of the expanded beads molded article in a state of leaving the molded skin of the measurement surface. This sample was fixed to the apparatus with a double-sided tape such that the skin surface thereof became a surface coming into contact with a tip of a pendulum, and the pendulum having a hammer diameter of 15 mm and an arm weight of 0.25 kg was swung down from a position at an angle of fall of 90±1°. Then, the pendulum was brought into contact with the molded skin surface of the sample from the thickness direction, thereby measuring a rebounding height h (mm) of the pendulum. The rebounding height h (mm) was divided by a falling height H (mm) of the pendulum, thereby calculating a rebound resilience. If the thickness of the sample is 12.5 mm, on the occasion of swing down the hammer, bottoming is caused, and thus, the thickness of the sample was set to 25 mm.

(7) Closed Cell Ratio

A closed cell ratio of the expanded beads molded article was determined in the following manner. First of all, five measurement samples were cut out from the expanded beads molded article into a cubic form of 25 mm×25 mm×25 mm. At that time, a molded skin was removed such that all the surfaces thereof were cut surfaces. In conformity with Procedures C described in ASTM-D2856-70, a "sum of a volume of the TPE composition and a volume of a closed cell portion in the expanded beads constituting the expanded beads molded article" Vx [cm³] of each of the measurement samples was measured with an air pycnometer "930" (manufactured by Toshiba Beckman Co., Ltd.); a closed cell ratio of each of the measurement samples was calculated according to the following formula (1); and these values were arithmetically averaged, thereby defining the closed cell ratio of the expanded beads molded article.

$$\text{Closed cell ratio [\%]} = (Vx - W/\rho) \times 100/(Va - W/\rho) \quad (1)$$

Va: Volume of measurement sample determined by the water immersion method [cm³]

W: Weight of measurement sample [g]

ρ: Density of TPE composition constituting the expanded beads molded article [g/cm³]

(8) Surface Hardness

A surface hardness of the expanded beads molded article was measured with a type C durometer in conformity with JIS K7312:1996.

(9) Compression Characteristics of Expanded Beads Molded Article (Stress-Strain Curve)

A sample in a rectangular parallelepiped form having a length of 50 mm, a width of 50 mm, and a thickness of 25 mm was cut out from the center of the expanded beads molded article. At that time, a molded skin was removed such that all the surfaces thereof were cut surfaces. Using this sample, the compression characteristics (stress-strain curve) of the expanded beads molded article was measured in conformity with JIS K6767:1999. Using "AUTOGRAPH AGS-X" (manufactured by Shimadzu Corporation) as a measurement apparatus, a load at the time of 5%, 10%, 25%, or 50% strain was measured at a compression rate of 10 mm/min, and this was divided by a pressure-receiving area of the test piece, specifically 50 mm×50 mm=2,500 mm², thereby calculating a compression stress at the time of 5%, 10%, 25%, or 50% strain. In addition, using a value of the compression stress at the time of 5% strain and a value of the compression stress at the time of 50% strain, a ratio of the compression stress at the time of 50% strain to the compression stress at the time of 5% strain of the expanded beads molded article was calculated.

5. Results

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Raw material particles | Raw material TPE | TPU DP9385A | TPU DP9385A | TPU DP9385A | TPU DP9385A | TPU DP9385A | TPU DP9385A | TPU DP9385A | TPU DP9385A |
|  | MFR of raw material [g/10 min] | 4 | 4 | 4 | 4 | 4 | 4 | 4 | 4 |
|  | Cell controlling agent | Talc | Talc | Talc | Talc | Talc | Talc | Talc | Talc |
|  | Amount of cell controlling agent [ppm] | 1000 | 1000 | 1000 | 1000 | 1000 | 1000 | 1000 | 1000 |
|  | Cross-sectional shape | Cross shape | Cross shape | Star shape | Star shape | Star shape | Circular shape | Cross shape | Star shape |

TABLE 1-continued

|  |  | Example 1 | Example 2 | Example 3 | Example 4 | Example 5 | Comparative Example 1 | Comparative Example 2 | Comparative Example 3 |
|---|---|---|---|---|---|---|---|---|---|
|  | Average particle weight [mg] | 10 | 5 | 5 | 5 | 5 | 10 | 10 | 5 |
|  | Average L/D | 1.0 | 1.0 | 1.0 | 1.0 | 1.0 | 1.0 | 1.0 | 1.0 |
| Expansion condition | Impregnation temperature [° C.] | 130 | 130 | 131 | 131 | 129 | 130 | 129 | 129 |
|  | Impregnation pressure [MPa (G)] | 4 | 4 | 4 | 4 | 4 | 4 | 4 | 4 |
|  | Expansion temperature [° C.] | 130 | 130 | 131 | 131 | 129 | 130 | 129 | 129 |
|  | Expansion pressure [MPa (G)] | 3.5 | 4.0 | 4.0 | 4.0 | 3.5 | 3.5 | 3.5 | 3.5 |
| Expanded beads | Cross-sectional shape | Cross shape | Cross shape | Star shape | Star shape | Star shape | Circular shape | Cross shape | Star shape |
|  | Apparent density [kg/m$^3$] | 240 | 240 | 240 | 240 | 380 | 180 | 190 | 380 |
|  | Bulk density [kg/m$^3$] | 104 | 96 | 92 | 92 | 146 | 100 | 83 | 146 |
|  | (Apparent density)/(Bulk density) | 2.3 | 2.5 | 2.6 | 2.6 | 2.6 | 1.8 | 2.3 | 2.6 |
| Molded article | Cracking [%] | 50 | 50 | 50 | 75 | 25 | 100 | 10 | 100 |
|  | Molding pressure [MPa (G)] | 0.30 | 0.28 | 0.26 | 0.26 | 0.28 | 0.30 | 0.25 | 0.28 |
|  | Density [kg/m$^3$] | 210 | 220 | 210 | 250 | 220 | 220 | 140 | 350 |
|  | Shrinkage factor [%] | 8 | 13 | 11 | 11 | 13 | 5 | 14 | 7 |
|  | Fusion bonding properties | A | A | A | A | A | A | A | A |
|  | Voidage [% by volume] | 31 | 20 | 30 | 18 | 57 | 8 | 37 | 15 |
|  | Compression set [%] after 30 minutes | 3.5 | 3.2 | 3.5 | 3.4 | 3.6 | 10.0 | 9.0 | 8.0 |
|  | Compression set [%] after 24 hours | 0.6 | 0.5 | 0.9 | 0.9 | 1.4 | 2.0 | 1.2 | 1.5 |
|  | Tensile strength at break [MPa] | 0.5 | 0.5 | 0.3 | 0.4 | 0.1 | 1.2 | 0.2 | 0.9 |
|  | Tensile elongation [%] | 140 | 160 | 90 | 100 | 70 | 250 | 50 | 120 |
|  | Rebound Resilience [%] | 60 | 56 | 55 | 55 | 54 | 64 | 61 | 49 |
|  | Closed cell ratio [%] | 91 | 83 | 82 | 82 | 82 | 91 | 91 | 82 |
|  | Surface hardness | 31 | 31 | 29 | 36 | 30 | 37 | 18 | 53 |
|  | Compression set [kPa] [5% strain] | 30 | 31 | 25 | 40 | 28 | 37 | 12 | 72 |
|  | Compression set [kPa] [10% strain] | 55 | 55 | 45 | 70 | 55 | 65 | 25 | 130 |
|  | Compression set [kPa] [25% strain] | 110 | 115 | 105 | 155 | 115 | 125 | 50 | 285 |
|  | Compression set [kPa] [50% strain] | 260 | 290 | 260 | 380 | 290 | 290 | 120 | 695 |
|  | Ratio [(50% strain)/(5% strain)] | 8.7 | 9.4 | 10.4 | 9.5 | 10.4 | 7.8 | 10.0 | 9.7 |

In the expanded TPE beads molded articles of Examples 1 to 5, the compression set 30 minutes after completion of compression is small as 3.2 to 3.6%, and it is noted that after deforming the molded article, the shape is substantially restored within a short time.

On the other hand, in expanded TPE beads molded article of Comparative Examples 1 to 3, the compression set 30 minutes after completion of compression is large as 8.0 to 10.0%, and it is noted that after deforming the molded article, the shape is not quite restored within a short time. According to this, by regulating the density of the expanded beads molded article to 150 to 300 kg/m$^3$ and the voidage of the expanded beads molded article to 10 to 70% by volume, respectively, it has been noted that an expanded beads molded article with favorable restorability of the shape within a short time after compressive deformation is obtained.

REFERENCE SIGNS LIST 1A to 1H, 1J, 1K, 1M: Expanded beads
11a to 11e, 11j, 11k, 11m, 12a to 12e, 12j, 12k, 12m, 13a to 13e, 13j, 13k, 13m, 14a, 14b, 14j, 14k, 14m, 15b, 15d, 15e, 15j, 15k, 15m, 16b, 16e, 16j, 16k, 16m, 17e, 18e: Protrusions

The invention claimed is:

1. An expanded beads molded article, which is obtained through in-mold molding of expanded thermoplastic elastomer beads, comprises voids among expanded beads, and has a density of 150 to 300 kg/m$^3$ and a voidage of 10 to 70% by volume.

2. The expanded beads molded article according to claim 1, wherein in the measurement of a compression set at 23° C. on a basis of JIS K6767:1999, the compression set of the expanded beads molded article 30 minutes after completion of compression is 7% or less.

3. The expanded beads molded article according to claim 1, wherein a tensile strength at break of the expanded beads molded article is 0.3 MPa or more.

4. The expanded beads molded article according to claim 1, wherein a modulus of repulsion elasticity of the expanded beads molded article is 50% or more.

5. The expanded beads molded article according to claim 1, wherein a modulus of repulsion elasticity of the thermoplastic elastomer constituting the expanded beads molded article is from 30 to 50%.

6. The expanded beads molded article according to claim 1, wherein the thermoplastic elastomer constituting the expanded beads molded article is a thermoplastic urethane elastomer having a type A durometer hardness of 95 or less.

* * * * *